United States Patent [19] [11] 4,442,484
Childs, Jr. et al. [45] Apr. 10, 1984

[54] MICROPROCESSOR MEMORY MANAGEMENT AND PROTECTION MECHANISM

[75] Inventors: Robert H. E. Childs, Jr., Cupertino; Jack L. Klebanoff, Sunnyvale, both of Calif.; Frederick J. Pollack, Aloha, Oreg.

[73] Assignee: Intel Corporation, Santa Clara, Calif.

[21] Appl. No.: 197,052

[22] Filed: Oct. 14, 1980

[51] Int. Cl.³ .............................................. G06F 9/19
[52] U.S. Cl. ................................................... 364/200
[58] Field of Search .............................. 364/200, 900

[56] References Cited

U.S. PATENT DOCUMENTS

| | | | |
|---|---|---|---|
| 4,044,334 | 8/1977 | Bachman et al. | 364/200 |
| 4,047,161 | 9/1977 | Davis | 364/200 |
| 4,060,849 | 11/1977 | Bienvenu et al. | 364/200 |
| 4,071,890 | 1/1978 | Pandeya | 364/200 |
| 4,084,224 | 4/1978 | Appell et al. | 364/200 |
| 4,104,718 | 8/1978 | Poublan et al. | 364/200 |
| 4,104,721 | 8/1978 | Markstein et al. | 364/200 |
| 4,183,085 | 1/1980 | Roberts et al. | 364/200 |
| 4,325,120 | 4/1982 | Colley et al. | 364/200 |

Primary Examiner—Jerry Smith
Assistant Examiner—Michael R. Fleming
Attorney, Agent, or Firm—Owen L. Lamb

[57] ABSTRACT

A memory management and protection mechanism in which access to protected entitites is controlled. The protected entities are represented by descriptors. Each protected entity is accessed via a selector which comprises an index integer assigned to the descriptor at the time of its creation. Tasks are active entities which may perform accesses and therefore are subject to control. A task has certain access rights. Each protected entity is assigned a specific privilege level. Each task within the system operates at one and only one privilege level at any instant in time. Protected entities which reside at a privilege level which is equal or less privileged than the current privilege level (CPL) of the task are generally accessible. The effective privilege level (EPL) of an access to a protected entity is defined as the numeric maximum of the CPL and the requested privilege level (RPL) present in the selector pointing to the memory segment to be accessed. An access is permitted if and only if the EPL is numerically less than or equal to the descriptor privilege level (DPL), assigned to the protected entity.

12 Claims, 5 Drawing Figures

MICROPROCESSOR MEMORY MANAGEMENT AND PROTECTION MECHANISM

FIELD OF THE INVENTION

The invention relates to data processing systems and, more particularly, to a storage accessing and protection mechanism.

The introduction of the 16-bit class of microprocessors, the Intel 8086 family, having a performance range of minicomputers, has resulted in users applying these microprocessors to complex computing problems. These new applications typically require the support of modern operating systems. It has become increasingly important that the underlying microprocessor architecture be matched to the proposed system usage, both for simplication of the operating system and for improved preformance.

The more complex microcomputer systems should provide full multitasking, real-time executive with task, communications, and space management facilities. Such systems are usually interrupt driven.

It is a primary object of the present invention to provide an address translation, segment-access control, and state transition mechanism that incorporates memory protection for use in a microprocessor.

SUMMARY OF THE INVENTION

Briefly, the above object is accomplished in accordance with the invention by providing protected memory-resident descriptor tables. The descriptors control access to all objects in the system. The descriptor tables are automatically accessed to obtain both physical location and protection information for segments and for control of all major system-state transitions. The descriptors within the tables are typed and contain descriptor privilege level (DPL) information. A currently-executing task is assigned a current privilege level (CPL). Tasks access the tables in order to gain access to objects within the system. Protection rules provide for a combination of the DPL, CPL, and type information to determine whether access will be permitted or denied to a particular task.

The invention has the advantage that each and every access by an active task to a protected entity is validated against the protection rules. The access is permitted only if the request is valid according to the access rights of the task to that protected entity.

In accordance with a further aspect of the invention, an effective privilege level (EPL) of an access to a protected entity is defined as the numeric maximum of the current privilege level (CPL) of the executing task and the requested privilege level (RPL) present in a selector which is used to access a memory storage segment. An access is permitted if and only if the EPL is numerically less than or equal to the DPL.

The invention has the advantage that it provides protection of a task from other tasks, protection of a segment at one level from any task at a less privileged level, and immediate detection of attempted protection violations.

The invention has the further advantage that the use of the requested privilege level (RPL) feature in a selector solves the problem of a procedure circumventing the protection rules by passing a pointer (which points to a storage segment to which it is not permitted access) to a procedure whose current privilege level (CPL) would permit access.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein.

DETAILED DESCRIPTION

Figure 1:
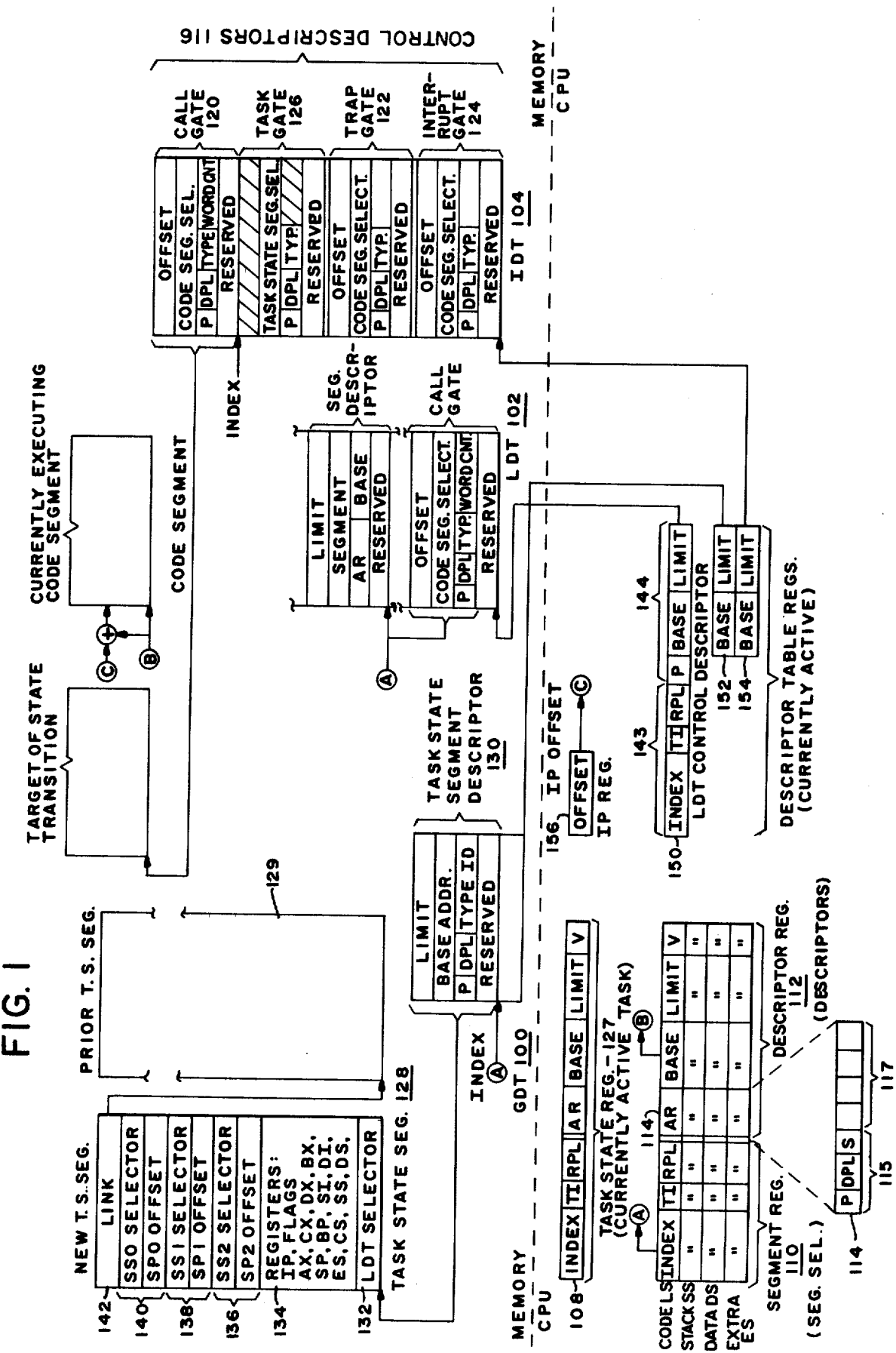
FIG. 1 comprise a composite block diagram of various data structures and microprocessor registers which are utilized by the memory management and protection system of the present invention.

The microprocessor Protection Model PM was developed to optimize the execution of an assumed system model. The design was driven by the high-end application requirements. A typical high-end application is assumed to have the following characteristics:

protection required for application and system reliability
heavily multitasked
performance critical
large real memory
interrupt driven.

The overall system is assumed to be organized with a clear distinction between application level and operating system. The operating system provides all resource scheduling, input/output functions and a variety of general services for usage by the applications. The applications are controlled, from a scheduling and resource allocation standpoint, by the operating system.

The range of system services includes a large body of functions and library procedures, which are utilized at both the application and system levels. A set of low level system functions also exist for the exclusive use of the operating system in performing the system control, I/O, resource allocation, and application service functions.

The operating system may be considered as a specific example of a set of basic operating system functions which would satisfy the system model. However, many other implementations exist which also satisfy the system model.

Typical system applications might include large multiterminal interactive business systems, mainframe front-end processors and complex communications systems.

The microprocessor provides a powerful address translation, segment access control and state transition control mechanism to support the protection model specified below as PM.

The implementation of protection is based on protected, memory resident, descriptor tables. The descriptor tables are automatically accessed to obtain both physical location and protection information for segments and for control of all major system state transitions. The PM protection rules are completely enforced by hardware within the microprocessor. Violations result in hardware-invoked traps which transfer control to violation handlers within the operating system. All protection control information is directly traceable to either program source declarations or explicit activity of a protected operating system kernel function.

The protection kernel of the operating system functions is an extension of the hardware-protection mechanism. PM does not specify the operation of the kernel. However, the kernel is expected to be the only software with the capability to modify the content of the PM specified descriptor tables.

The PM technical requirements and objectives have been rigorously defined and are a natural extension of the 8086 Intel architecture described in the 8086 Family User's Manual, dated October, 1979, copies of which may be obtained from: Literature Department, Intel Corporation, 3065 Bowers Avenue, Santa Clara, CA 95051. The resulting features are listed below for ease of reference:

PM provides a simple application migration path for 8086 application programs.

PM protection provides:

Hierarchical, four-level protection mechanism.

Protection of a task from other tasks.

Protection of a segment at one level from any task at a less privileged level.

Immediate detection of attempted protection violations.

Means for two or more tasks at the same level to cooperate (e.g., share data)

Enforcement of access restrictions of memory segments (e.g., read only, execute only, accessible only from certain privilege levels, etc.)

Support of high performance synchronous requests of functions to be performed by more privileged levels on the behalf of less privileged levels.

Support of conforming (library) segments; the requested procedure assumes the protection level of the caller and may call procedures at any more privileged level.

Support of logical segments having restricted access rights to the corresponding physical segment.

The following segment classifications are provided:
Ready only
Execute only
Execute and read only
Read/write only (i.e. not executable)
*Privilege level only visibility
*Segment length less than or equal to physical maximum.
*Not present
*Orthogonal restrictions to the others; a segment may be accessible from only a certain privilege level AND be read only. etc.

PM memory management provides:
Virtual address mapping by supporting:
Hardware mapping of logical segments into the physical address space of the microprocessor-based system.
Dynamically alterable logical to physical address mapping permitting dynamic relocation of part or all of the task's real address space.
Support of 16M byte real address space.
The support necessary for operating systems to provide dynamic segment swapping.

PM I/O processing supports:
Interrupt handlers that may be invoked at any of the four protection levels. It is therefore possible to protect the operating system kernel from interrupt handlers.

I/O instructions that may be executed at all four protection levels.

I/O operations that are fully protected via memory-mapped I/O devices, thereby permitting I/O usage of the complete protection mechanism.

Restricting the tasks that may execute the I/O instructions.

An interrupt system that is capable of performing a complete, high performance, task switch when an interrupt handler is invoked. It is therefore possible to isolate an interrupt handler from all other tasks.

Protection Model (PM)

The protection model consists of three components: protected entities, active subjects, and rules governing the access of the subjects to the protected entities.

Access to protected entities is controlled. They are represented by descriptors. The entities represented in PM are: main memory segments, descriptor tables, gates, and task state segments. Each protected entity is accessed via a selector, which comprises an index integer assigned to the descriptor at the time of its creation and additional PM control information.

Subjects are active entities which may perform accesses and are therefore subject to control. In PM, only tasks are active entities, and thus subjects. A task is a single sequential thread of execution characterized by an processor execution state and a set of logical named entities, which have as attributes access rights, and which are a dynamic function of the execution state and execution history.

Protection rules govern the access of subjects to the protected entities and represent the relations between them. In PM, each and every access by an active task to a protected entity (an active task is one executing on an microprocessor processor under PM) is validated against the protection rules. The access is permitted IF AND ONLY IF the request is valid according to the access rights of the task to that protected entity.

Tasks

All operations within PM are performed by tasks. A task is an executing program. A task is characterized by a single sequential thread of execution, a current task state, and an addressable logical address space including a set of four stack segments. The static attributes of a task are tables which contain information concerning all of the accessible entities. The dynamic attributes of a task are the register contents, the current privilege level, the currently selected procedure and the values of all accessible data elements.

Privilege Level

PM supports a four-level protection hierarchy. The most privileged level is number 0 and the least privileged level is number 3.

Each protected entity within the system is assigned a specific privilege level. Each task within the system operates at one and only one privilege level at any instant in time. Protected entities which reside at a privilege level which is equal or less privileged than the current privilege level (CPL) of the task are generally visible and accessible, as long as they reside within the logical address space of the task. (Protected entities which do not reside within the logical address space of the active task are neither addressable nor accessible.) Protected entities which reside at a more privileged level than the current privilege level of a task are not accessible.

Pointers

A full pointer in PM in a 32-bit logical name. A pointer consists of a 16-bit selector and a 16-bit offset. A pointer is always evaluated within the logical address space of the task. The selector is encoded as a 13-bit index into a descriptor table, a 1-bit table selector and a 2-bit quantity which indicates the requested privilege level (RPL) for protected entity access. The offset is a 16-bit integer which indicates the desired byte within the protected entity. Segments may contain any number of bytes up to a maximium of 64K. The offset field is not defined when the indicated protected entity is not a segment.

A short pointer, consisting of an 8-bit selector, is supported for accessing entities in the interrupt vector table.

Descriptor Tables

PM utilizes three classes of descriptor tables: Interrupt Descriptor Table (IDT), Global Descriptor Table (GDT) and Local Descriptor Table (LDT).

The IDT and GDT are system tables which are always present in the system's address space. The LDT is a task dependent table which is a portion of each task's state. The logical address space of a task consists of the descriptors in the GDT, IDT, and currently assigned LDT.

Each of the descriptor tables is organized as a linear array of descriptors. The index portion of a selector indicates which descriptor in the tables is to be selected.

The IDT, GDT and LDT may be located at any real memory address. The GDT and LDT may contain a maximum of 8192 descriptors. In the IDT, however, only 256 descriptors are addressable.

Descriptors

PM utilizes descriptors to contain all information about the attributes and addressing of all protected entities in the system. Descriptors are organized into two categories; segment descriptors and control descriptors.

Segment descriptors are the primary mechanism for enforcing protection rules upon all accesses to segments and performing the logical address to real address translation function. Segment descriptors contain a type indicator, privilege level, base address and length of real memory segments.

Control descriptors are the primary mechanism for enforcing protection rules upon all major state transitions. Control descriptors contain a type indicator, privilege level and pointer to the target of the state transition.

Flags

PM introduces three special flag bits in the flag register of the microprocessor. Nested Context (NC) is a single-bit flag which indicates the existence of a no-nempty chain of task state segments. It is created and maintained by the hardware task switch operation. I/O privilege level (IO_PL) is a 2-bit value in the flags which indicates the least privileged level permitted to perform I/O instructions.

Machine Status Word

A status register, the Machine Status Word (MSW), is included in the microprocessor. This register is used to indicate the system configuration and processor status.

Four MSW bits are defined. Protection enable (PE) is a single-bit flag that indicates invocation of the protection model. Three other bits are used to manage usage of a coprocessor and/or for emulation of a coprocessor. The math present (MP) bit indicates whether a floating point math coprocessor is present. The emulation mode (EM) switch indicates whether the coprocessor function is to be (software) emulated. The task switched (TS) flag indicates whether the microprocessor has performed a task switch. The TS flag is used to manage the state of the math coprocessor. The TS bit is set by the microprocessor on each task switch but is reset by software.

Protected Entity Accessing

Segments are accessed by the implicit or explicit loading of a segment register and a subsequent request for a real memory access to the contents of the segment. PM obtains, under hardware control, the descriptor indicated by the selector being loaded into a segment register. Basic validity checking is immediately performed to assure that the selected descriptor is a segment which may lawfully be accessed via the segment-register type and is accessible from the current privilege level. Failure of these basic tests will result in an immediate protection violation trap. All subsequent references to main memory are checked for full conformance to the access restrictions and for a byte offset value within the defined limit of the segment size. Failure of these tests will also result in a protection violation trap. The supported segment types are as follows:

Read only data
Read/write data
Execute only
Execute and read only
Conforming execute only
Conforming execute and read only Execute-only segments and conforming execute only segments may also be selected via CS (see the above-referenced 8086 User's Manual). Readable or read/write segments, including those with the execute or conforming attributes, may be selected via DS or ES. Data segments must have write permit in order to be accessed via SS.

PM enforces protection rules upon all major state transitions by the usage of control descriptors. All state transitions which involve the increase of the privilege level or a change of processor task must reference a control descriptor. The control descriptor contains a type field, a privilege level, and a pointer to the new processor state. The type field is checked to confirm that it is the correct type of control descriptor for the desired state transition. The privilege level is checked to assure the accessibility of the control descriptor from the current privilege level. Successful passing of these checks will result in transition of the processor state to the value indicated by the control descriptor.

The supported types of control descriptors are:
Call gate
Trap gate
Interrupt gate
Task gate Task state Segment
Local descriptor table.

The call gate is utilized for CALL transitions within a task which results in an increase of privilege level. The call gate may also be utilized for transitions that stay at the same privilege level, if desired, in order to support delayed binding. These operations include CALL, JUMP, INT n, processor trap and external interrupt operations. The trap gate is used for interrupt and trap operations that stay within the same task but do not disable interrupts. The interrupt gate is utilized for interrupt and trap operations which stay within the same task but result in disabling interrupts. The task gate and task state segment are utilized for all operations which result in the invocation of an entirely different task.

A special control descriptor type is used to indicate the space allocated to a Local Descriptor Table (LDT). An LDT control descriptor may only be selected for initializing an on-chip register which points to the LDT.

IMPLEMENTATION OF PM

Overview

This section contains a technical specification of the operation of PM on the microprocessor. The first portion characterizes the address space, protected entity access control, segment descriptors and segment access control. Then, the various means of transferring control and using control descriptors are examined. Next are specifics of the CPU registers and the new or modified microprocessor instructions which support the PM model. The next section specifies the interrupts which have been defined for protection violations and use 8086 reserved interrupt vectors and error codes returned for each interrupt. Finally, special circumstances that arise from coprocessor and multiprocessor configurations are discussed.

Address Space and Protected Entity Access Control

Referring to FIG. 1, the PM mechanism uses descriptors to regulate and manage the contents of the address space of a task through control of the entities that are allowed to be accessed. These entities are represented in the address space by descriptors.

Descriptors in memory are maintained in descriptor table segments, which are entities known to the hardware. There are three types of tables: Global Descriptor Table (GDT, 100) Local Descriptor Table (LDT, 102) and Interrupt Descriptor Table (IDT, 104). The location and limit information of the active IDT, GDT and LDT are kept in hardware registers. These three tables completely represent the address space of a task.

A task when active under PM must have a GDT and an IDT (which handles external interrupts and protection violations). In order to achieve isolation between tasks, it is necessary to create for each task a LDT in PM to represent its private portion of the logical address space. Tasks created in such a format may now acquire a complete address space through the inclusion of a task state segment descriptor (106) in the GDT.

Privilege levels are numbered 0, 1, 2, 3 in order of decreasing privilege. Privilege levels are available as a system resource; it is not necessary to use all privilege levels in every application. Use of levels 0, 3 alone will support a two-level system. Sophisticated applications, as typified by many contemporary operating systems, can specify the application of all four levels. The privilege level of a task is used by the hardware in a manner specified below.

Selectors

A selector is a 16-bit quantity comprising three fields:

| FIELD NAME | SYMBOL |
| --- | --- |
| Requested Privilege level | RPL |
| Table Indicator | TI |
| (0 = GDT, 1 = LDT) | |
| Index | INDEX |

A selector that contains all zeros in the table indicator and index fields is a special case used primarily to allow the hardware the means of representing an invalid segment selector in a segment register. Thus descriptor number 0 is not allowed in the GDT.

Memory Addressing

The address of a byte (or a word) in memory consists of a selector and an offset. The selector indicates the segment in which the byte is located. Most microprocessor instructions will use a short form of address specifying only the offset with the implied usage of a segment descriptor register (110, 112) which has been previously loaded with a segment selector (and descriptor).

Interrupt Addressing

Interrupt addressing is within the interrupt descriptor table (104). This table contains control descriptors. An interrupt address is an 8-bit address.

I/O Addressing

I/O port addressing is via a 16-bit quantity. There is no address mapping for an I/O port. (All I/O ports use real addresses.)

Access Control

Every time a descriptor is loaded the microprocessor validates the protection access status. A violation of the protection rules will cause an interrupt.

The access control rules for an entity are encoded in its descriptor. The descriptor is a four-word quantity. The access byte (114) is the sixth byte in all descriptors. A portion of the access byte (115) is common for all descriptors. The information in the common portion is:

| NAME | SYMBOL |
| --- | --- |
| PRESENT | P |
| DESCRIPTOR PRIVILEGE LEVEL | DPL |
| SEGMENT (segment/control) | S |

The complete format of the access byte differs depending on whether the descriptor is a segment descriptor (112) or a control descriptor (116).

The present indicator is used to indicate that the entity is present in real memory. If not-present, then the descriptor does not point to an accessible entity in real memory. Any hardware access of the descriptor will result in a protection trap. This is useful both for deletion of previously valid descriptors and for support of demand swapping functions.

The descriptor privilege level (DPL) is the privilege level assigned to the protected entity. Semantics for usage of the privilege level are discussed below.

The segment indicator (S) is the gross classification of descriptors into segment or control types. Descriptor formats and semantics of usage are discussed below.

Privilege level

Privilege level is a major part of access control. At every moment the executing task is at some privilege level, called the current privilege level (CPL).

The effective privilege level (EPL) of an access to an protected entity changes dynamically and is defined as the numeric maximum of the CPL and the requested privilege level (RPL) present in the selector. An access is permitted IF AND ONLY IF the EPL is numerically less than or equal to the DPL.

The Requested Privilege level has been introduced to solve the "Trojan Horse" problem. For example, consider a file system procedure, fread(file_id, nbytes, buffer_ptr). It reads data from a file into a buffer, overwriting whatever is in the buffer. Normally fread would be available at the user level but the file system procedures and data would be privileged so that user level procedures cannot directly change the file tables. However a user-level procedure could use a pointer into the file tables as his buffer pointer, causing the fread procedure to unwittingly corrupt the file table.

Use of the requested privilege level feature can prevent this. The called procedure need only ensure that all selectors passed to it have an RPL at least as high (numerically) as the caller's CPL. Then a protection fault will result if the selector is used to access a segment that the caller would not be able to access directly. The caller's CPL is found in the CS selector which was pushed on the stack, and a special instruction can be used to appropriately adjust the RPL field of a selector parameter.

Segment Descriptors and Segment Access Control

Segments are classified into two categories: executable segments and data segments. The basic format of both types of descriptors are identical as shown below at register 112.

The segment base is the 24-bit real memory address of the beginning (lowest) byte address of the segment. The limit is the maximum (minimum for expand down segments) value of offset which may be validly utilized in accessing the contents of the segment.

Executable Segments

The detail portion (117) of the access byte (114) is utilized to distinguish between executable and data segments and provide specific protection and activity information for the segment.

The detail portion of the access byte for executable segments contains the following:

| NAME | SYMBOL |
| --- | --- |
| Executable | E |
| Conforming | C |
| Readable | R |
| Accessed | A |

Executable segments are indicated by E=1. Executable segments may never be written and may not be loaded into SS. A segment must be executable in order to be selected by CS.

When a normal (i.e., nonconforming) executable segment is correctly invoked, the CPL is changed to be equal to DPL of the segment. If a level change occurs, this operation will result in the invocation of a new stack segment. RPL is also forced equal to DPL in CS.

When a conforming executable segment is invoked CPL does not change. The RPL will be adjusted in the CS to be equal to the CPL. A conforming executable segment whose DPL is numerically greater than CPL may not be accessed.

Executable segments may be readable, as indicated by R=1. Readable executable segments, both normal and conforming, may be accessed via DS and ES. Readable conforming segments are readable from any privilege level.

The accessed bit (A) is provided in both executable and data segment descriptors. Whenever the descriptor is accessed by the microprocessor hardware, the A bit will be set in memory, if not already set, when the descriptor is loaded. The reading of the access byte and the restoring of the access byte with the accessed bit (A) set is an indivisible operation (i.e. performed as a read-modify-write with bus lock).

The purpose of this feature is to provide a mechanism for developing a segment usage profile in demand swapping systems.

Data Segments

The detail portion (117) of the access byte is utilized to distinguish between executable and data segments and provide specific protection and activity information for the segment.

The detail portion of the access byte for data segments contains information as indicated below:

| NAME | SYMBOL |
| --- | --- |
| Executable | E |
| Expand down | ED |
| Writable | W |
| Accessed | A |

Data segments are indicated by E=0. Data segments may always be read and may not be selected by CS. A data segment is always accessible via DS and ES.

A data segment may expand up or down. Normal data segments, indicated by ED=0, expand up. In any access to the segment the offset used must satisfy the condition:

O LESS THAN OR EQUAL TO offset LESS THAN OR EQUAL TO limit.

If such a segment is expanded (by the operating system) it is expanded by increasing the limit. Data segments may instead expand down, indicated by ED=1. In this case offsets used to access the segments must satisfy the condition:

limit LESS THAN offset LESS THAN 64K.

When this type of segment is expanded it is expanded by decreasing the limit. This is preferable for stack segments.

A data segment may be writable, indicated by W=1. Writable data segments are accessible via DS, ES, or SS.

A data segment must be writable in order to be accessible via SS.

The accessed bit (A) of the access byte is as defined for executable segments.

Control Descriptors and State Transitions

The careful and precise control of all state transitions, that is changes in the control flow of the processor, are of crucial importance to successful protection. All such transitions are checked for conformance to the protection rules.

There exist two major classifications of system state transition: sequential within a task and transition from one task to another. An orthogonal classification is into call, return, and branch transitions. On a call transition the hardware saves a pointer back to the previous state. In a return transition the hardware follows such a pointer back to a previous state. In a branch transition no pointer is saved. A return is not normally desired subsequent to a branch.

Task sequential transitions have two major varieties: intralevel and interlevel. Intralevel transitions remain within the same privilege level. They present little difficulty since there is no change to the addressable entities. Interlevel transitions, those which cross privilege level boundaries, are substantially more complex. This complexity is due to the necessity for assuring the integrity of the protected entity access rules between levels and control of the change in the addressable protected entities.

The intertask transition is the most complex form of change to the control flow. An intertask transition represents a complete change of processor state and the selection of a new set of addressable protected entities.

Control Descriptors

There exist six types of control descriptors: call gates (120), trap gates (122), interrupt gates (124), task gates (126), task state segments (128), and descriptor tables (130). In general, the call gate is used for synchronous transitions. The trap gate is used for asynchronous intratask transitions. The interrupt gate is utilized for asynchronous intratask transitions which result in interrupt disable. The task gate is used for transitions between tasks. The tasks state segment contains the entire task state and certain task control information. The descriptor table holds descriptors for the protected entities.

Call Gates

A call gate (120) consists of a present bit, privilege level, type identifier, argument word count, code segment selector, and offset. A call gate may exist in either of the basic descriptor tables: GDT or LDT. A call gate specifies a procedure that returns with a return instruction, as opposed to an interrupt return instruction.

Interrupt Gate

An interrupt gate (124) consists of a present bit, privilege level, type identifier, code segment selector, and offset. An interrupt gate may only exist in the IDT. An interrupt gate specifies a procedure that enters with interrupts disabled and returns via an interrupt return instruction. The layout of an interrupt gate is identical to a call gate except that the type is different and the word count value is ignored.

Trap Gate

A trap gate consists of a present bit, privilege level, type identifier, code segment selector, and offset. A trap gate descriptor may only exist in the IDT. A trap gate specifies a procedure that enters with interrupt enable status unchanged and returns via an interrupt return instruction. The layout of a trap gate is identical to an interrupt gate except that the type is different.

Task Gate

A task gate (126) consists of a present bit, protection level, type identifier and a task state segment selector. A task gate may exist in any of the three descriptor tables: interrupt, global, or local.

Task State Segment

A task state segment (128) is a special, fixed format, segment. The purpose of this segment is to contain all of the state information for a task and a linkage field. Task state segments come in two forms: busy, and available. A busy task state segment is one that is active or is on a chain of task state segments. A task state segment descriptor consists of a present bit, privilege level, type identifier, segment base address and segment limit. The value of the type identifier of a task state segment descriptor is different for available or busy. A task state segment descriptor is expected to reside only in the global descriptor table (GDT).

The task state segment contains sections which are accessed but not modified (static) and sections which are modified under hardware control by PM. The static sections consist of the LDT selector (132) and the pointers (136, 138, 140) for the initial (empty) stacks of the three most privileged levels. Each stack pointer consists of a segment selector (SS) and a stack offset (SP) value.

A stack pointer is not needed for the least privileged level since that stack is either the current (active) stack or can be located via the back link chain from the current stack.

The modified (dynamic) portion of the task state segment consists of all of the dynamically variable and programmer visible processor registers (134). This portion also contains a linkage word (142) that is used to chain nested invocations of different tasks. The actual content of the linkage word is either null or a task state segment selector.

Descriptor Table

A descriptor table is a special type of segment that contains descriptors. A descriptor table descriptor (144) consists of a present bit, privilege level, type identifier, segment base address, and segment limit.

Only the LDT (102) is described by a descriptor table descriptor. The GDT and IDT are defined normally only at system initialization, using real addresses.

CONTROL TRANSFERS

Intralevel Transitions

An intralevel transition is a transition which begins and ends at the same privilege level within the same task. Intralevel transitions in the microprocessor are directly comparable to transitions in the 8086. The basic function of this type of transition is the selection of a new point of execution and the establishment, on the stack, of a return link as necessary.

The new point of execution may exist in the same code segment. In this case, the short form of branch, jump, or call may be utilized. Protection is provided by limit checking on the code and stack segments.

Alternatively the new point of execution may exist in a different code segment. In this case a full pointer, consisting of a code segment selector and an offset, must be provided. The full pointer may be contained in the instruction in the intersegment form of the call or jump instructions. In this case the protection mechanism ensures that the indicated segment is indeed directly addressable and an executable segment. It will also ensure that there is no privilege level transition; that is, it checks that the indicated segment is either at the current level or that it is a conforming segment with a DPL less than or equal to the CPL.

An intersegment call, or an intersegment jump may also utilize a call gate. The existing 8086 instruction formats are retained for all cases. The offset specified in intersegment call and jump instructions will be ignored if the instruction's selector points to a call gate. The actual code segment selector and offset used in the transition will then be taken from the call gate. The word count in the gate is ignored for intralevel transitions. The protection restrictions which apply in this case are as follows.

The instruction's selector is selecting a call gate.

The current level and the requested privilege level in the call gate selector (i.e., the EPL) must both be of equal or greater privilege (numerically less than or equal to) the level of the call gate.

The selector in the call gate must point to a code segment. For an intralevel transition the code segment must be at the current level. The RPL in the selector in the call gate is ignored.

Violation of any of the above rules will result in a protection violation trap. Conformance with the above rules will result in a successful control transfer and, in the case of call or interrupt instructions, establishment of an appropriate return linkage on the stack. The return linkage will be identical to the return linkage established by the comparable 8086 instructions.

An interrupt or trap operation may utilize either a trap or interrupt gate in the IDT. Utilization of a trap gate will result in no change to the interrupt enable flag. Utilization of an interrupt gate will result in resetting the interrupt enable flag. For either a trap or interrupt gate, the flags will be pushed on the stack, prior to any change in the interrupt enable flag, and the resulting stack image will be identical to that established by the comparable 8086 operation.

The return instructions (RET and IRET) will directly utilize the return linkage established on the stack.

Interlevel Transitions

The interlevel transitions are, by definition, a transition in the current privilege level (CPL) and, hence, a major change in the addressable entities. The implications of this are that the compliance with the protection rules for the transition must be carefully monitored and the integrity of the protected entities between the levels must be assured.

The basic philosophy for the support of this type of transition is as follows.

Call, trap and interrupt operations may only be performed from a less privileged level to a more privileged level. (Calls, jump, traps, interrupts, and returns to the same level are allowed, but fall under the class of intralevel, not interlevel, transitions.)

Returns to a more privileged level are not allowed. (Returns to the same level come under intralevel transitions).

Transitions to a more privileged level may only be performed through call, trap, or interrupt gates.

A new stack, whose privilege level is identical to the target privilege level, is selected.

Interlevel jumps are not allowed.

The utilization of a gate ensures that all transitions to a more privileged level will go to a valid entry point, not into the middle of a procedure, or worse still into the middle of an instruction. The utilization of a separate stack segment whose privilege level is identical to the target level assures that other tasks which may be operating at a lesser privilege level within the same address space will not corrupt the stack of a task operating at a more privileged level. Isolation of the stacks on a per task basis must be provided in order to assure that different tasks do not try to use the same stack space.

An interlevel transition may be performed by the intersegment call, interrupt, RET, or IRET instructions, or it may be invoked by the occurance of an internally or externally generated interrupt. The following protection rules apply to calls and interrupts.

The transition must be via a gate.

Both the requested privilege level (RPL) in the gate selector and the initial level (CPL) must be of equal or greater privilege (numerically less than or equal to) than the gate (DPL). This restriction is not applicable for external interrupts or protection traps.

The code segment selected in the gate must be of greater privilege than the initial level. (If the selected code segment is at the same level then the transition is intralevel and the rules discussed in the previous section apply.) If the selected code segment is less privileged than the current level, then a protection violation trap will be generated.

The offset indicated in the call gate must be within the limit of the code segment.

The actual operation of the transition will appear, from the programmer's view, to be essentially identical to that provided on the 8086, with the exception of the stack image. The new, more privileged, stack will be selected from the appropriate element in the task state segment. Initially, this stack is empty. Upon completion of the state transition, the new stack will contain a pointer to the top of the less privileged stack, the procedure parameters, and the normal return linkage. The number of words to be moved over as parameters from the original stack is specified in the word count byte in the call gate. (The word count byte is ignored in intralevel transitions). If this count is specified as zero then no parameters are moved. The illustration below shows the general form of the stack image upon the successful completion of an interlevel call.

| ! PARAMETERS | ! | ! IP | ! | |
|---|---|---|---|---|
| ! . | ! | ! CS | ! | stack grows |
| ! . | ! | ! PARAMETERS | ! | upward |
| ! . | ! | ! $SP_i$ | ! | |
| ! . | ! | ! $SS_i$ | ! | |
| ! ———— | ! | ! ———— | ! | |
| OLD STACK level = i | | NEW STACK level LT i | | |

In the case of a transition through an interrupt or trap gate the flags are pushed on the new stack between PARAMETERS and CS, and the nested context flag is then reset. In a few interrupt cases, to be defined later, an error code is pushed on the new stack after IP.

The SS$_i$ and SP$_i$ values pushed on the stack constitute a pointer into the previous stack. Procedures that have a variable number of parameters or that have more than 32 parameter words cannot use the parameter copying feature of call gates. These types of procedures can use the SS$_i$ and SP$_i$ values to get the parameters.

An important part of assuring the integrity of the fire wall between levels is parameter verification. Parameter verification consists of checking and adjusting as necessary the RPL of any selectors passed as parameters to assure that the RPL is numerically greater than or equal to the CPL of the caller. The CPL of the caller may be determined from the RPL of the CS selector on the stack. The procedure called may in fact only be an interface procedure that after moving and verifying the parameters only calls another procedure at the same level to do the actual work.

Intertask Transitions

Intertask transitions are the transistion of the processor from active execution of one task to the active execution of another task. This is clearly a common occurrence in a multitask system. A transition from executing one task to executing another task occurs for two basic reasons: completion of the current computational requirements of a task or the occurance of an external event. The necessary operation consists of the termination of active execution of the first (outgoing) task, saving its complete processor state in memory, loading a complete processor state for the next (incoming) task and beginning execution of the incoming task. The major requirement upon a protection system is the careful control of the circumstances upon which a different task may be invoked and the complete isolation of the logical address spaces and task state segments.

PM supports, in hardware as a single instruction, intertask transitions. These operations include the saving of the complete processor state and the loading of a different processor state. These transitions are controlled with task gates which are analogous to call gates. Task state segment descriptors (130) point to memory-resident task state segments (128, 129). These segments are special protected control segments which are used for saving the processor state and for storing the linkage for nested invocations. Task gate descriptors may exist in any of the descriptor tables. Task state segment descriptors must reside in the GDT (100).

An intertask transition is invoked by external interrupts, internal traps, or by interrupt n, intersegment call, or intersegment jump instructions that select a task gate or task state segment descriptor. If a task gate descriptor (126) is selected, then a task state segment descriptor is selected by the gate. The new (incoming) task state is obtained from the selected task state segment (128). The new task state segment must be marked as available (not busy) to ensure that it has only one current usage. If the task state segment is marked busy, i.e. already in use, then a protection fault results. If the new task is successfully entered into execution then the task state segment descriptor is marked busy. In the case of a transition initiated by a jump the outgoing task segment (129) is set not busy. In the case of transitions initiated through traps, interrupts or calls the task state segment selector of the outgoing task (previously located in the register, 127) is stored in the linkword (142) of the new task state segment and the Nested Context (NC) flag is set.

An intertask interrupt or call transition may be reversed with an IRET instruction. The IRET instruction causes the nested context flag to be examined. If the flag is off then execution will remain within the same task: Flags (134) and the return link (142) are taken from the stack. If the nested context flag is on then an intertask transition will occur: the current task is suspended, its state saved in its task state segment and the linkword of its task segment fetched and verified, if valid the linkage word points to the (incoming) task which then resumes execution. The outgoing task's segment becomes available by being marked not busy.

To ensure correct operation in a multiprocessor environment a bus lock is applied during the testing and setting of the task busy bit. This is sufficient to ensure that two processors do not invoke the same task at the same time, however, it will not avoid a protection fault. Some other mechanism for resolving conflicts must be used to avoid protection traps. This will be discussed further in the section on multi processor considerations.

CPU REGISTERS AND INSTRUCTIONS

General Registers

The microprocessor provides the same eight 16-bit registers as the 8086 for general purpose arithmetic and effective offset address computation. The general accumulator registers are AX, BX, CX and DX. These registers may also be utilized as eight 8-bit registers. The index/pointer registers are SP, BP, SI and DI. SP is used as a stack pointer. The other registers are available as general index registers.

The usages of the eight general registers, as implemented in the 8086 instruction set, are identical in the microprocessor.

| ! AH ! AL ! | AX |
|---|---|
| ! BH ! BL ! | BX |
| ! CH ! CL ! | CX |
| ! DH ! DL ! | DX |
| Accumulators | |
| !             ! | SP |
| !             ! | BP |
| !             ! | SI |
| !             ! | DI |
| Pointer and Index Registers | |

Segment Registers

PM modifies the way in which the general program visible segment registers (110) are utilized and extends each of the registers by the addition of a corresponding descriptor register (112). The descriptor registers are invisible at the general instruction set level. However, the on-chip descriptor registers are essential within the microprocessor hardware in order to obtain the performance objectives and the functionality of PM.

The normal program visible segment registers (110) in PM are CS (Code Segment), SS (Stack Segment), DS (Data Segment) and ES (Extra Segment). PM uses the segment registers to contain segment selectors instead of segment base addresses, as in the 8086.

Each of the segment/descriptor registers (110, 112) is composed of five fields. The selector field is a 16-bit field. It is the only program visible field. The AR field (114) is a 8-bit field which contains the access rights of the segment. The base field is the 24-bit real address of the lowest byte address in the segment. The limit field is a 16-bit quantity which indicates the segment limit. The V field is a 1-bit field which, when set, indicates the valid status of the descriptor.

Descriptor Table Registers

PM has three active descriptor tables, IDT, GDT and LDT. Three new registers (150, 152, 154) are used to locate the currently active descriptor tables.

|     |          | Base | Limit |   |
|-----|----------|------|-------|---|
| GDT | !        |      | !     | ! |
| IDT | !        |      | !     | ! |
|     | Selector | Base | Limit |   |
| LDT | !        | !    | !     | ! |

Each of these registers contains a 24-bit base field and a 16-bit limit field. The base field gives the real memory address of the beginning of the table. The limit field gives the maximum offset that may be used in accessing table entries. The selector field (143) of the LDT register (150) gives the selector for the LDT descriptor. LDT descriptors must reside in the GDT.

Task Register

The task state register (127) is a new register required for PM. This register points to the task state segment (128) for the currently active task. This register is similar to a segment register, with selector, base, and limit fields. Only the selector field is readable under normal circumstances. Special semantics of the normal state transition instructions are utilized to select a new task state segment and associated descriptor.

Flag Register

PM adds three new flag bits to the 8086 flag register definition. The new flag bits are a single bit for nested context (NC) and two bits to indicate I/O privilege level (IO_PL)

The Nested Context flag indicates the valid presence of a back link to a previous task state segment (129) in the current task state segment. (See the previous discussion of the intertask transition mechanism for the intepretation of this flag.)

The I/O Instruction Privilege Level flags indicate the maximum privilege level permitted to perform (I/O instructions. Level 0 is always permitted to perform I/O.

Alteration of the I/O Instructions privilege level flags (IO_PL) is restricted to level 0 and task switches.

Instruction Pointer

The Instruction Pointer register (IP) contains the 16-bit offset of the current instruction to be executed within the current code segment. Operation is identical to the 8086.

Machine Status Word

The machine status word indicates the microprocessor configuration and status. It is not part of a task's state. The usage of the bits is as follows:
Task Switched (TS)
Emulation Mode (EM)
Math unit Present (MP)
Protection Enable (PE)

The task switched flag indicates that a task switch has been done. It is set under hardware control and reset under software control.

The emulation mode flag (EM) indicates that a coprocessor function is to be software emulated. If EM=1 but MP=0, then all escape instructions will be trapped.

The math present (MP) flag indicates whether a math coprocessor is present. If MP=1 then escapes and waits will be trapped when TS=1.

The protection enable (PE) flag indicates that PM mapping and protection rule enforcement will be performed. When reset, the microprocessor will emulate the 8086.

MICROPROCESSOR INSTRUCTIONS

The microprocessor supports all 8086 instructions. Only new instructions or instructions whose semantics are changed to support PM are discussed below. The remainder of the instruction set is described in the above-mentioned 8086 Family User's Manual.

Load/Store IDT, GDT

Four instructions are provided to load and store the contents of IDT and GDT (LIDT, LGDT, SIDT, and SGDT). These instructions move three words starting at the effective real memory address to or from the indicated descriptor table base/limit register. These instructions are executable only at level 0. The format of the three words is a one-word limit, a 3-byte real base address, followed by an unused byte.

These instructions will not normally be utilized except for initialization.

Load/Store LDT

Two instructions are provided to load and store the contents of the LDT register. LLDT (load LDT) takes as its operand a selector for a descriptor table. It loads the LDT register from the descriptor for the descriptor table.

SLDT (store LDT) stores the local descriptor table selector from the LDT register. LLDT is only executable at privilege level 0. SLDT is unprivileged. Note that LDT descriptors must reside in the GDT.

Load/Store Task State Segment Selector

Load and store of the task state segment selector register is performed by LTR and STR respectively. LTR instructions will not normally be utilized except for initialization. LTR is executable only at level 0. STR is unprivileged.

Read Access Rights

The read access rights instruction obtains the access rights field of the descriptor selected by a selector. If the indicated descriptor is not legally accessible from the current task state, or if it does not exist, then only the flags are affected.

This instruction is useful for parameter verification operations which are more extensive than the verification of the RPL.

Verify Access

The verify for read and verify for write instructions determine whether the action (read or write) is permitted on a specified selector. These instructions can be used to verify parameters without getting a protection fault.

Read Segment Length

The read segment Length instruction loads the length of a segment into a register. If the indicated descriptor is not legally accessible from the current task state then only the flags are affected. It can be used in verifying a parameter without getting a protection fault.

Adjust RPL

The adjust RPL instruction changes the RPL field of a selector, allowing a procedure to set it to the maximum of the original value and some specified level.

Load/Store Machine Status Word

These two instructions respectively load the MSW from memory and store it to memory. Load MSW may only be executed at level 0. Store MSW is not privileged.

Clear TS Flag

This instruction resets the TS flag. Setting of the flag will be done implicitly when the hardware performs a task switch. The clear TS flag instruction may only be performed at privilege level 0.

GENERAL REDEFINITION OF 8086 INSTRUCTIONS

The major change in the semantics of the 8086 instructions is the enforcement of protection rules and the formation of real memory addresses. The majority of the 8086 instructions will perform the same functions under PM. Move from a segment register will store the currently defined selector if the register is valid, else zero.

Exceptions to the above are explicity discussed below.

Move to Segment Register

PM changes the semantics of move to segment register. The move of a selector to a segment register causes an immediate descriptor table reference. The selected descriptor is obtained from the table and protection rule checking is performed. The move to CS operation is not permitted and will result in a protection violation trap.

Long Call/Return

The long call operations have been augmented in PM. The same machine language codes are used.

A long call containing a executable segment selector will result in the logically identical operation to that provided in the 8086. However, the selector may also be a call gate, task gate or task descriptor.

Usage of a call gate may result in either an intralevel or an interlevel transition.

Usage of a task gate or task state segment descriptor will result in a task switch. A task switch is accomplished by the storing of the entire processor state in the outgoing task state segment, the loading of a new processor state from the indicated (incoming) task state segment and the saving of the outgoing task selector in the incoming task segment linkword. Execution then continues with the new task state.

The intersegment return reverses the action of an intralevel or interlevel call operation if a task switch was not made. An interlevel return will result in popping the old SS and SP values from the stack, thereby restoring the less privileged stack. RET n instructions will result in the addition of n to SP at the new level.

An IRET via the task selector stored in the task linkword is required in order to reverse the operation of a call or interrupt via task gate or call or interrupt to task descriptor. An intersegment return (RET) may not be used to perform this operation.

Interrupt/IRET

PM supports a broad range of interrupt functions. In all cases, control is transfered via the selected descriptor in the IDT. The IDT may contain a trap, interrupt, or task gate.

An interrupt through a trap or interrupt gate operates much like an intersegment call. The differences are that an interrupt causes the flag register to be pushed into the stack before the CS and IP, and that an interrupt changes the NC, TF and, perhaps IF flags. The nested context flag is reset. The procedure called by a trap or interrupt gate must return via an interrupt return instruction to pop the flags. An interrupt via an interrupt gate will additionally reset the interrupt enable flag. Protection fault interrupt operations will also push the error code onto the final stack. The error code is the last value to be pushed.

An interrupt via a task gate will operate in exactly the same way as a call via a task gate. Protection fault interrupts will additionally push the error code onto the stack as the last operation.

The IRET is the reverse of an interrupt. IRET uses the nested context flat to determine if the return is intersegment or intertask.

If the nested context flag is off, then IP, CS and flags are popped. If the requested privilege level (RPL) in the CS selector is different from the current privilege level (CPL), then SS and SP are also popped, thus switching stacks.

If the nested context flag is set, then IRET performs a task switch to the task state segment indicated by the selector in the linkword of the outgoing task state segment. The nested context flag is reset before storing the outgoing (initial) task state.

Intersegment Jump

An intersegment jump may select a code segment, call gate, task gate or task segment. A jump to a different privilege level within the same task is not supported and will result in a protection violation. A jump to a context gate or task state segment will cause a task switch. The current task state is saved and the new task state becomes the processor state. The nested context flag is not set.

Privileged Instructions

PM restricts the execution of some instructions in order to protect the data structures and registers required by the protection mechanism and the state of I/O devices.

The following instructions may only be executed at level 0:

| | |
|---|---|
| LGDT | Load GDT |
| LLDT | Load LDT |
| LIDT | Load IDT |
| LTR | Load Task Register (TR) |
| LMSW | Load MSW |
| CTS | Clear TS flag |

| | -continued |
|---|---|
| HLT | Halt |

Additionally, I/O privilege level will remain unchanged by a POPF or IRET operation except at level 0. POPF does not change the nested context flag except at level 0. A task switch will also change the I/O privilege level and nested context flags.

I/O instructions, and interrupt enable/disable are restricted to execution at a floating level. The least privileged level which may execute the following instructions is indicated by the I/O privilege level value in the flag register:

IN
INW
OUT
OUTW
STI
CLI
INSB
INSW
OUTSB
OUTSW

Additionally, modification of the IO privilege level, and interrupt enable, is restricted. The IO privilege level flags are only modified at privilege level 0 (the most privileged level). The interrupt enable flag is only modified at privilege levels that may perform IO. Execution of set and clear interrupt instructions at privilege levels not allowed to modify the interrupt enable flag will cause a protection trap. A POPF or intratask IRET instruction that illegally attempts to modify the IO privilege level, nested context or interrupt enable flags will not change these flags.

PROTECTION FAULTS

A protection fault will cause a trap, an interrupt that is not maskable. There are a large number of possible protection violations. Since it is quite difficult for software to interpret them without hardware support, the microprocessor uses a 16-bit error code and several interrupt vectors to identify protection violations.

When a protection fault is detected a trap is generated. The trap may invoke a trap, interrupt or task gate depending upon the gate type in the IDT; the fault may be handled by the task that caused it or it may be handled by a different task.

Protection faults can be classified into two types: either an implicit request for service or a program error. Stack overflow and not present faults are examples of implicit service requests. An attempt to write into a read-only segment or a regular limit violation are examples of program errors. The microprocessor is designed to ease the handling of service request faults. The different types of service requests use different interrupt vectors. By contrast, many different types of protection faults use the same general protection fault vector.

Furthermore, instructions that cause service request faults are generally restartable without any back-out on the part of the fault-handling software. Restartable means that it appears that the fault was invoked immediately before the violating instruction was started. The saved instruction pointer points to the first byte of the violating instruction and all other saved machine state is exactly as it was before starting execution of the violating instruction. In this case, if the fault handler clears up the fault condition and performs an IRET the (previously) violating instruction will execute properly. Except for execution time, it will appear that there was no fault. The microprocessor does not provide full restartability on all fault types. The description of each interrupt will indicate whether it allows instruction restart.

Some of the protection traps cause a one-word error code to be pushed on a stack. The error code is always the last thing to be pushed and is pushed onto the stack that will be active when the trap handler begins execution. This ensures that the trap handler will not have to access another stack segment to find the error code.

PROTECTION INTERRUPTS

Invalid Opcode

When an invalid opcode is detected interrupt 6 is invoked. The saved IP will point at the invalid opcode. No error code is pushed. It may be handled within the faulting task. This interrupt allows full restartability.

Math Address Error

This interrupt is used to signal that the math coprocessor has overrun its segment limit. It is generated by the coprocessor data channel during the limit test which is performed on each transfer of data between memory and math coprocessor.

Invalid Task State Segment

This interrupt is invoked when it is discovered that a task state segment is invalid. It is essential that this interrupt be handled through a task gate.

This fault is invoked if the task state segment is too small; if any of the LDT, SS, CS, DS or ES selectors are invalid or point to inappropriate descriptors; or if the LDT is marked not present. The fault is generally found in an intertask transition, it is also detected in an interlevel transition if the new stack selector points to an invalid descriptor.

If the fault was detected on an interlevel transition then the fault-handling task will be linked to the original task and the IP stored in the original task's state segment will point at the offending call, or interrupt instruction. The previous task's IP will point at the next instruction if the transition was being made in response to an external interrupt. The error code will be of the form: INDEX, TI, O, EX where index and TI form the selector that the processor attempted to use as the new stack selector. EX=1 indicates, that the transition was on behalf of an external interrupt. EX=0 indicates that the transition was not on behalf of an external interrupt.

If the fault is detected in an intertask transition to a task state segment that is too small then the fault handler's task state segment will be linked to the original task state segment. If the fault is detected in an intertask transition to a task state segment that has some other problem (LDT, SS, CS, DS, or ES selector or descriptor inappropriate, or LDT not present) then the fault handler's task state segment will be linked to the new one. In either of these cases the error code will be of the form: INDEX, TI, O, EX, where index and TI are taken from the selector that points to the offending descriptor. EX indicates whether the transition was in response to an external interrupt or not.

Not Present

This interrupt is invoked when an attempt is made to load a segment or use a control descriptor that is marked not present.

There are two exceptions. An attempt to load a not present LDT segment in a task switch results in an invalid task state segment fault. An attempt to load a not present stack segment as part of an intertask or interlevel transition results in a stack fault.

The error code is of the form: INDEX, TI, I, EX. The index field is the table index of the descriptor. The TI field is the table selector, undefined if the descriptor is in the IDT. The EX field is 1 if the fault was detected while receiving an external interrupt, 0 otherwise. The I field is 1 is the descriptor is in the IDT, 0 otherwise.

If a not present fault is detected in the loading of CS, DS, or ES in a task switch then the selectors for the other segment registers will have been loaded but their descriptors may not be loaded; hence these other segment registers will not be valid for memory accesses. If control is transferred out of the faulting task and then returned back after the segment is marked present then the other segment registers will get loaded in the return. The stack segment will be checked before CS, DS or ES so that it will be usable and the not present fault handler can operate, within the faulting task.

The not present interrupt fully supports instruction restart.

Stack Fault

This interrupt is invoked when a stack underflow or overflow is detected, and when a not present stack segment is encountered in an intertask or interlevel transition. An error code is pushed. It has the form: index, TI, O, EX. The index and TI (table indicator) fields form a selector for the stack segment involved. The EX field indicates whether the fault was detected while trying to process an external interrupt or not. EX=1 indicates that an external interrupt was in process.

It is expected that this interrupt will be fielded through a task gate, since the interrupt handler may not otherwise have a valid stack segment. However, if the software can assure that the stack used by the stack fault handler is valid, then the fault can be handled within the same task.

This interrupt fully supports instruction restart.

This interrupt is inactive in compatibility mode except for the very unusual case in which a stack is aligned to odd addresses and there is an attempt to push or pop a word at the maximum effective address, i.e., the high order byte is outside the segment.

General Protection

The general protection fault is invoked on all protection faults not covered by the previous cases. In the case of limit read or write violations the error code is zero. If the violation is detected on attempting to load a segment register or use a control descriptor the error code will have the form index, TI, I, EX. The index and TI fields came from the selector being processed when the fault was detected. The EX field is 1 if the fault was detected while an external interrupt was being processed; the EX field is 0 otherwise. The I field is 1 if the index pertains to the IDT; it is 0 otherwise.

On general protection faults the original machine state is not always saved. Therefore full instruction restart is not provided in all cases.

This interrupt is inactivate in compatibility mode except for two cases. One is for the case in which an attempt is made to execute an instruction which is not entirely contained on the current code segment. The other case is for attempts to read or write a data word at the maximum effective address, i.e., the high order byte is outside the segment.

CONCURRENT ACCESS TO PROTECTED ENTITIES

This section will examine the permitted or prevented multiple usage of all protected entities in the system by multiple processors.

Task State Segments

A task state segment represents a task which is a single sequential thread of execution. Any attempt to concurrently execute a task by two or more processors must therefore be prevented. The status of the task, as indicated in the descriptor, effectively prevents any attempted concurrent execution.

Descriptor Tables

Descriptor tables are owned by processes. A process may consist of more than one task. Each task in a process may be in a different and independent state of execution including active execution. Therefore, descriptor tables may be actively utilized by concurrently executing tasks. The problems occur only when the contents of the tables are modified.

Generally, multiple usage of gates and segments are permissible. However, the contents of segments must be modified in accordance with a synchronization protocol which is outside of the scope of PM. The base instruction set does provide the necessary indivisible semaphore operation.

The multiple usage of gates is generally permissible. The problem occurs when the entity pointed to by the gate is in a dynamically changing state. Code segments may not be modified and therefore may be utilized by multiple concurrent tasks. Coordination, via semaphores, will be required for dispatch operations in order to prevent excessive frequency of software induced protection traps on task state segment collisions. Hardware induced collisions on task state segments may occur unless there is substantial coordination of the interrupt and trap vectoring between multiple concurrent processors.

Ordinary interrupts may be structured as reentrant procedures. Alternately, a separate IDT may exist for each processor, thereby providing separate tasks for handling each interrupt for each processor. Separate IDT's may be conveniently provided by placing each processor's IDT at a different address, or by placing each IDT at the same address in physical memory that is local to each processor. Alternately, separate GDTs may be provided for each processor, thereby achieving the same result of permitting separate tasks to handle the same interrupt vector on a per processor basis.

Descriptors

Multiple concurrent usage of descriptors is not a problem as long as the descriptors do not change. However, provision must be made for the dynamic modification, deletion and creation of descriptors. These conditions require the provision for accommodating the hardware dynamic update of descriptors and revalidation of potentially stale descriptors in the descriptor registers.

The only hardware dynamic update of the descriptors occurs with the accessed bit in segment descriptors and the busy bit task state segment descriptors. These operations are made indivisible in order to prevent any possible conflict.

Validation of on-chip descriptors is best performed upon software signal, subsequent to marking descriptors not present but prior to modifying the data structures indicated by the descriptors. Consideration has been given to providing a separate signal which forces revalidation of all active descriptors. However, the provision of a separate signal is not necessary since a simple reentrant procedure that is invoked by an interprocessor interrupt and that causes the reselection of all active segments is sufficient. The infrequency of this operation makes the software overhead acceptable.

DETAILED DESCRIPTION OF PREFERRED EMBODIMENT

Figure 2:
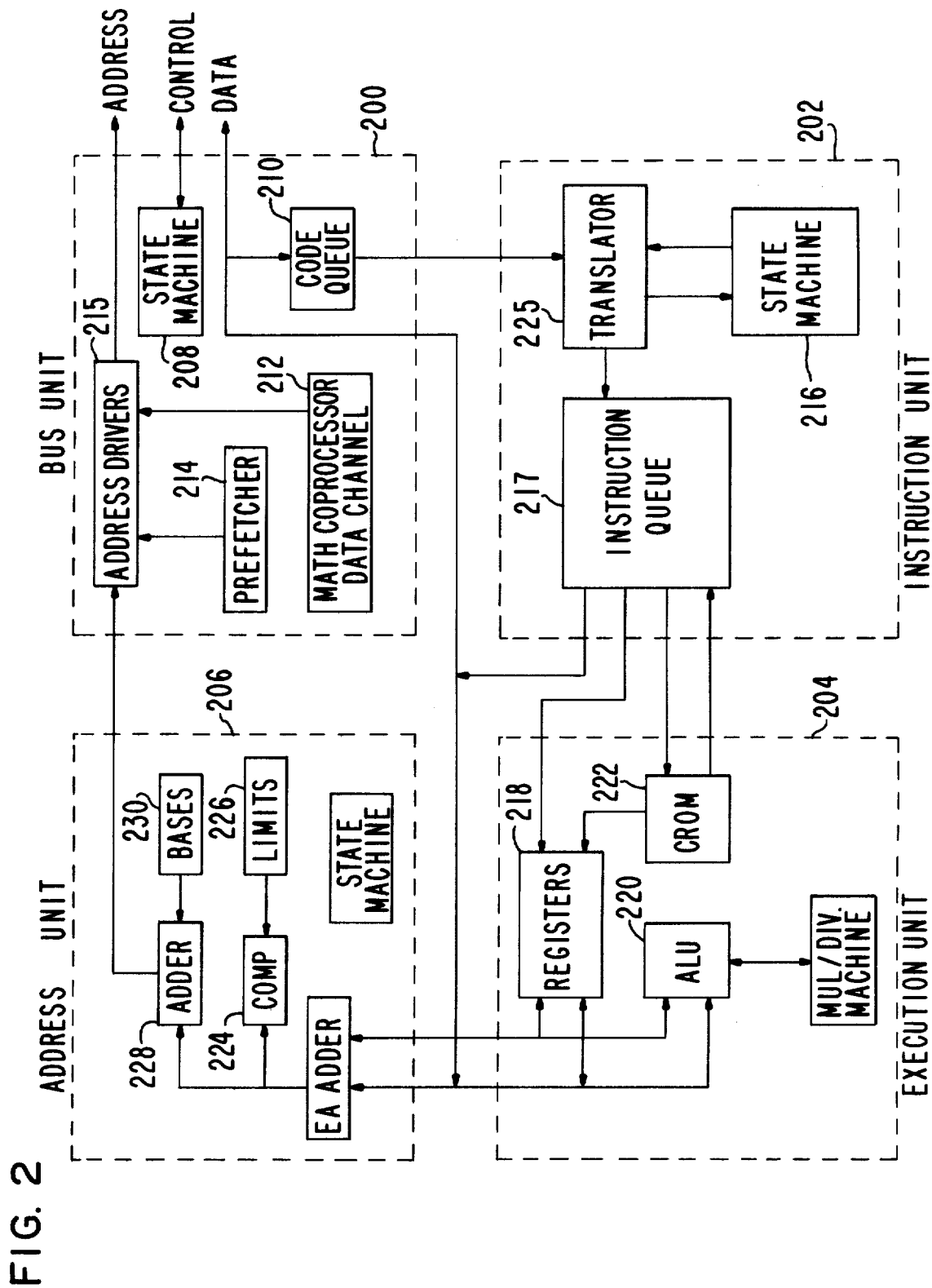
FIG. 2 is a block diagram of a microprocessor of a type in which the invention may be embodied.
Figure 3:
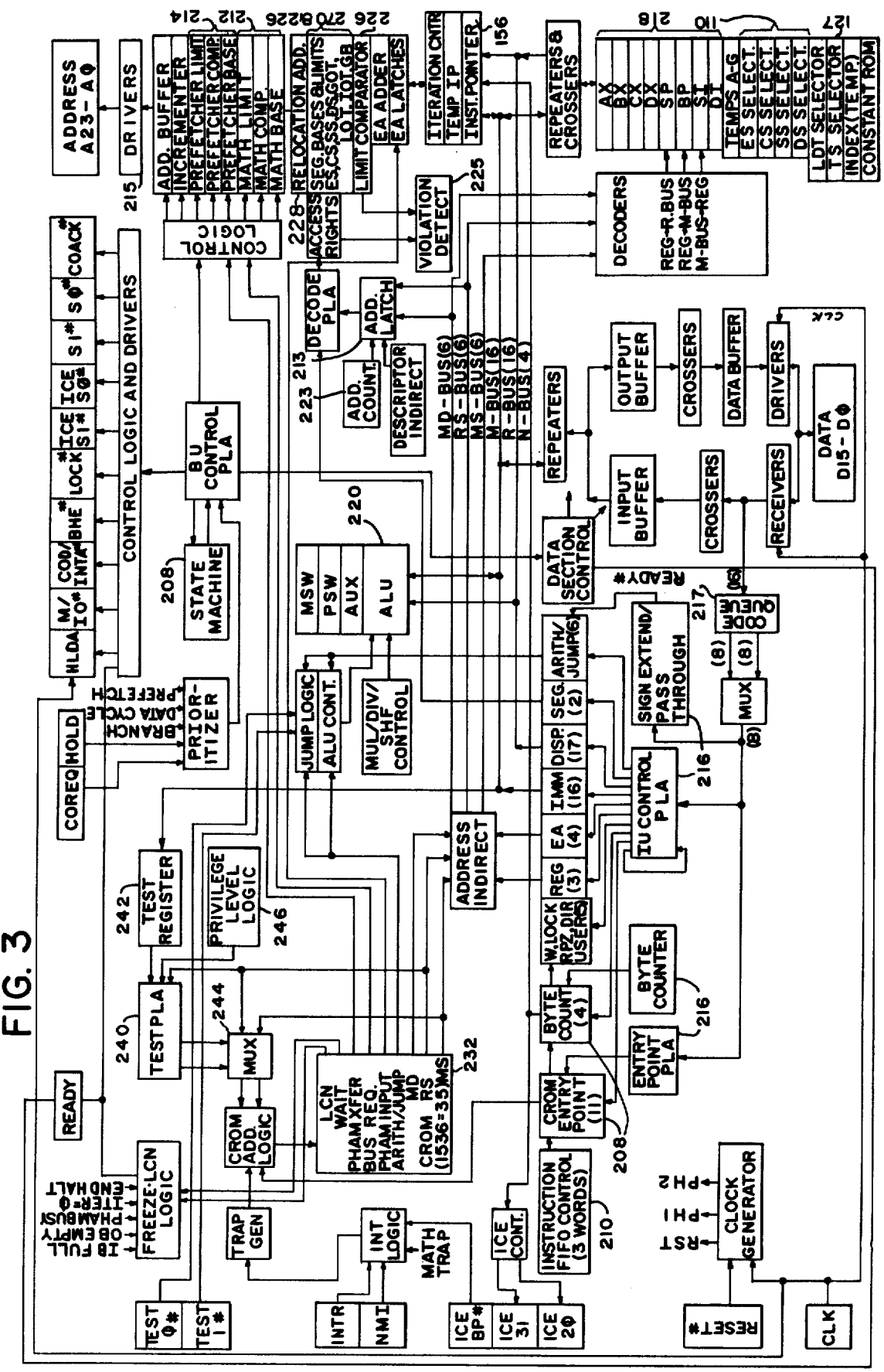
FIG. 3 is a more detailed block diagram of the microprocessor shown in FIG. 2.

Refer now to FIG. 2. A basic central processor can be implemented as a single logical unit with a single state machine. However instruction execution throughput will suffer since no parallelism between instructions is possible. An improvement in throughput can be obtained by providing either pipelining so that the single-state machine can operate on more than one instruction at a time or by providing more state machines. The present microprocessor is implemented with four logical units each capable of operating as an independent state machine and using pipelining, as shown in FIG. 3. These units are called the bus unit (200), the instruction unit (202), the execution unit (204), and the address unit (206).

The Bus Unit

The bus unit provides the interface with memory and external input/output subsystems. It contains a bus cycle controller state machine (208) and dedicated functional blocks (214, 212) for implementing code prefetch and math coprocessor data channel support. A bus cycle prioritizer examines bus cycle requests from four different sources and prioritizes them as follows:

External bus masters (HOLD request).
Math coprocessor data channel.
address unit.
code prefetcher.

It can be seen that the code prefetcher (214) has lowest priority for bus cycles and, therefore, will prefetch code when there are no other demands for bus cycles.

The code prefetcher and the math coprocessor data channel both operate on real addresses which have been previously prepared by the address unit along with a real address limit required for memory protection enforcement. In this way both the prefetcher and data channel may generate bus cycles which are performed solely by the bus unit without assistance, other than initialization, by the other units.

During periods when the memory bus would otherwise be idle, the code prefetcher obtains code from memory under the assumption that the microprocessor is executing sequentially. Code obtained in this way is placed in a code queue (210) where it is available for access by the instruction unit. Whenever the microprocessor ceases sequential execution; i.e., executes some form of branch, the code queue is flushed and the prefetcher is initialized with a new real address and limit. Whenever the prefetcher attempts to fetch from an illegal location, as indicated by the prefetcher limit, the Bus Unit refuses to perform the memory cycle and places a violation marker in the code queue.

The Instruction Unit

The instruction unit (202) is designed to decode and format instructions in order to relieve the execution unit of this function so that instruction execution will be faster. The instruction unit obtains bytes of code from the bus unit code queue (210) and prepares fully decoded instructions in its instruction queue.

The instruction set consists of byte variable formats. The instruction unit contains a state machine (216) which steps from state-to-state based on the value of each code byte as it is removed from the code queue. The state machine controls the filling of the instruction queue with fully decoded instruction data.

Capacity of the instruction queue is three instructions with each instruction formatted to include all the information necessary for instruction execution with the single exception of nonimmediate data operands.

The Execution Unit

The execution unit (204) is where actual instruction execution occurs. It contains the main registers (218) and ALU (220) as well as several dedicated logic boxes for fast execution. The execution unit is controlled by a control ROM (CROM, 222). Execution of a particular instruction consists of a sequence of microinstructions being supplied from the CROM. Part of the information contained in the instruction queue of the instruction unit is an entry point address into the CROM. As the sequence of microinstructions for any particular instruction nears completion, the CROM generates a signal causing the next CROM address to be taken from the instruction queue (217) so that the next sequence of microinstructions begins with no time lost.

From time to time the microinstructions may specify that bus cycles should be preformed for data reads or writes or for redirecting the bus unit prefetcher for program branches. In these case the microinstruction directs the address unit (206) to compute a real address from operands supplied to it over internal data buses.

The Address Unit

The address unit (206) performs three address calculations for each bus cycle. One calculation is to form the effective address (EA) as the sum of, as much as, two register contents and the address displacement from the instruction queue (217). This effective address is compared (224) to the limit (226) of the selected segment to determine if a memory protection violation has occurred. The final calculation is the addition (228) of the effective address to the base value (230) of the selected segment in order to form the real address.

In order to improve the speed of these address calculations, segment base (230), segment limit (226), and segment access rights are contained inside the address unit in an explicit cache. During the above mentioned address calculations the access rights of the selected segment are also tested for conformance with memory protection rules.

Effective address operands and command information are latched by the address unit so that the execution unit may proceed with other operations or even other instructions without waiting for the address unit to complete its operations.

The address unit is capable of continually reforming its result until the bus unit has finished its previous duties and is ready to accept the address unit result.

Instruction Processing

The function of the above-described structure is to reduce the number of microinstructions required for each instruction to bare minimum and to keep the execution unit constantly busy executing these microinstructions. The provision of the instruction unit allows advanced decoding and formatting of instructions while the execution unit is executing microinstructions for some previous instruction. Thus when the execution unit is ready to begin the next instruction, no clock cycles need be devoted to decoding or formatting. For example, the move immediate to register instruction executes in only two processor cycles, while the same instruction on the Intel 8086 requires four processor cycles. This speed up is largely due to the preformatting of the instruction in the instruction unit which places the immediate value in the instruction queue as part of the instruction information.

In addition, several logic boxes are provided inside the execution unit in order to ensure fast instruction execution. For example, multiply and divide hardware allow the shift and add (or subtract) algorithms to be executed at the rate of one bit position per processor cycle as opposed to the six (or more) processor cycles required for the Intel 8086 which uses microinstruction loops.

Another large throughput enhancement is provided by the address unit which forms addresses and performs memory protection checking with dedicated hardware rather than microinstruction sequences. For example, data cycles on the 8086 microprocessor can increase by up to seven processor cycles above the minimum for complex address modes. This increase for the present microprocessor is limited to one processor cycle.

Memory Cycles

In order for the internal logical units to work together efficiently, it is necessary that information be moved to and from memory fast enough to prevent the queues from running dry. Therefore, a high bandwidth memory interface is required. A highly optimized memory interface pipelines bus cycles so that each bus cycle consists of three processor cycles, but successive bus cycles can be performed at the rate of one bus cycle every two processor cycles. This provides a bandwidth of 8 mega- bytes per second while allowing memory acess times of 242.5 nanoseconds from address valid to read data valid.

In addition to providing a high bandwidth bus, maximizing throughput also requires that the collision rate between bus cycles be minimized. The goal here is to ensure that the prefetcher only runs memory cycles when the execution unit does not need the bus to perform data reads or writes. Naturally the prefetcher is given lowest priority when the bus unit prioritizes bus requests, but more significant collision avoidance is provided by an advance warning sent from the CROM to the bus unit which informs the bus unit control that no prefetch cycle should be initiated because a data cycle will soon be requested. A final bus efficiency feature is the ability of the instruction unit to determine that a branch instruction has been prefetched and to inform the prefetcher that prefetching should be suspended. This feature reduces overfetching and frees bus capacity for the math coprocessor data channel and for external bus masters.

Referring now to FIG. 3, the microprocessor of FIG. 2 will be described in more detail. The bus unit is responsible for supplying code to the instruction unit. To this end the bus unit generates main memory cycles as required to obtain code and places this code in a code queue (210). The output of the code queue is available to the instruction unit for removal of code bytes.

The bus unit includes a prefetch mechanism (214) which fetches code bytes in advance of their being required by the instruction unit. Each prefetch cycle normally obtains two bytes of code. This prefetch mechanism normally generates sequential addresses with the expectation that the microprocessor is executing sequential code. For each new address, the prefetcher (214) must perform a limit test to determine if the new address has exceeded the limit of the current code segment. If the limit has been exceeded, then a memory cycle will not be generated. Instead a special marker will be placed in the code queue and the prefetch mechanism will cease operation. This marker is capable of propagating through the code queue and into the instruction unit. If the marker also passes through the instruction unit and into the execution unit, then a memory protection trap will occur since there has been an attempt to execute code from an illegal address. In this way prefetches beyond a segment limit do not result in memory cycles and no trap occurs unless actual execution of forbidden code is attempted.

Program branches require that the code queue be flushed and that the prefetcher be reinitialized and prefetching resumed if it had been halted. In order to minimize pipeline filling delay, the new address is passed from the execution unit through the prefetch mechanism and directly to the address drivers (215). The prefetcher latches this new address and also accepts a new segment limit, if required, from the execution unit. At this point normal prefetching is resumed. Since minimization of pipeline filling delay is very important, the interfaces from input receivers to the code queue and to the instruction unit are designed so that information can be passed directly from the receivers (223) through the code queue and to the instruction unit without clock-cycle loss. When bus cycles are generated in the execution unit, the bus unit is given an advanced notification so that the prefetches can be inhibited. This allows the execution cycle to proceed ahead of the prefetch so that the execution unit does not wait on prefetches.

As code is accepted by the instruction unit, partial instruction decoding occurs to the extent that the instruction unit is capable of detecting branch instructions and instructing the bus unit to halt prefetching. This eliminates overfetching during the time that a branch instruction propagates through the instruction unit and enters the execution unit.

Limit checks on main memory cycles will always be performed early enough so that invalid memory accesses can be aborted before memory commands are issued. This abort is implemented by inhibiting activation of the bus cycle status signals.

In addition to code acquisition, the bus unit is responsible for performing data reads and writes from/to main memory. Data cycles are initiated by the address unit which furnished addresses and read/write information to the bus unit.

The bus unit is responsible for coordinating the sequencing of data cycles and prefetch cycles, since only one cycle can be performed at a time. Since the execution unit is required to wait on data reads, data cycles are given priority over prefetch cycles so that if a data cycle and a prefetch cycle are ready to begin simultaneously, the prefetch cycle will be forced to wait. Any cycle, once initiated, will run to completion without interruption for any other type of cycle.

Data cycles are initiated by the address unit which passes a 24-bit real address to the bus unit along with read/write information. Upon completion of a read cycle, data is passed from the bus unit to the execution unit. At the beginning of a write cycle, data is passed from the execution unit to the bus unit.

The address unit also informs the bus unit as to whether the current data cycle is to be performed upon a byte or a word. This information is used to control the bus high enable signal (BHE#). In addition, the address also instructs the bus unit as to which address space is to be used, ICE or user's. This information is used to select which bus cycle status signals to use, S0# and S1# or ICES0# and ICES1#.

The bus unit also includes temporary address and data latches (213, 215). These latches are used to buffer the address and data for a write cycle if the bus unit is busy with a current bus cycle. This buffering allows the execution unit to proceed with execution instead of waiting on the bus unit for completion of the current bus cycle. If a write cycle is initiated by the execution unit while the bus unit buffers are busy, the bus unit will require the execution unit to wait until the current cycle terminates and the buffer contents are removed for used in the next bus cycle.

The bus unit contains a coprocessor data channel for support of a math processor. This channel operates in a manner which is very similar to direct memory access. The channel contains an address counter and a limit checker so that all data transfers can be made to comply with protection requirements.

Miscellaneous bus cycles include I/O, interrupt acknowledge, and halt/shutdown cycles. These cycles are all initiated by the execution unit. The bus unit treats them as data cycles in regard to prioritization so that the bus unit can inhibit the prefetcher in order to avoid lost clock cycles due to bus collisions. Therefore the execution unit is seldom required to wait because the bus is busy with a prefetch.

During each processor cycle, the bus unit polls and prioritizes all of the bus cycle requests in order to grant the next available bus cycle to the highest priority request. The requests are prioritized in the following way:

| | |
|---|---|
| (HIGHEST) | External bus masters which are attempting to gain control of the bus through use of the HOLD signal. |
| (LOWEST) | The coprocessor data channel. |
| | The execution unit. |
| | The prefetcher. |

The instruction unit accepts code bytes from the code queue (210) of the bus unit and prepares instructions in the instruction queue (217). This instruction queue is accessible by the execution unit.

The instruction unit includes a state machine (216) which is capable of decoding the meaning of code bytes as they are accepted from the bus unit code queue. The state machine is designed to know when it is fetching the first byte or prefix of a new instruction and is capable of determining whether additional bytes are required. As additional bytes are removed from the code queue, the state machine has already determined if the byte is second opcode byte, memory reference byte, address displacement, immediate data, or other.

The instruction translator accepts code bytes from the bus unit code queue and state information from the state machine and produces reformatted instruction information and load signals for the instruction queue as well as update information for the state machine. A special CROM entry point value (209) is produced and included in the instruction queue.

Certain instructions allow address displacements and/or immediate data which can consist of either one byte or two bytes. In the case of byte values, various rules are used concerning the extension of the byte to a two-byte value as required by the instruction queue and the execution unit.

The sign extender (211) accepts code bytes from the bus unit code queue and state information from the state machine and provides a two-byte value with proper sign extension to the instruction queue.

The instruction queue accepts specially-formatted instructions from the instruction translator (225) and buffers them until they can be accepted by the execution unit. The reason for this special formatting of instructions is to support fast execution of instructions in the execution unit. To this end, address displacements and immediate data are included with the corresponding instruction in the instruction queue. In fact, all necessary information required for instruction execution, with the sole exception of nonimmediate data operands, is included in the instruction queue. Therefore, instruction execution can quickly run to completion without requiring slowdown for the acquisition of additional information (except data operands).

As bytes are removed from the code queue, a byte counter (221) records the number of bytes included in the current instruction. When a complete instruction is assembled in the next vacancy in the instruction queue, the byte count for that instruction is also entered with the instruction in the instruction queue. This byte count is used in the execution unit to update the instruction pointer and is also output to the ICE system so that ICE can track execution addresses.

The execution unit accepts specially-formatted instructions from the instruction queue of the instruction unit and executes the instructions as fast as is reasonably possible with the available technology.

The execution unit is controlled by a microprogram control ROM (CROM, 232) which contains the necessary microoperations for the sequencing and control of instruction execution. Entry points to the CROM are supplied from the entry-point field of the instruction queue.

In order to minimize chip size and power consumption, the CROM is implemented with dynamic circuitry so that a one-clock-cycle delay exists from address input to microoperation output. The delay is made to appear invisible because the next-to-the-last microoperation of each instruction is programmed to signal the CROM to accept a new address entry point from the instruction queue. In this way the first microoperation of a new instruction immediately follows the last microoperation of the previous instruction with no intervening wasted clocks.

Most storage nodes in the execution unit are contained in a uniformly structured quasi-RAM file called the main register file (218). The main register file contains all 8086 Intel-style general registers, all required segment selectors, and several temporary registers.

The execution unit is designed so that any programmer modification of a segment selector value will automatically generate the required memory cycles in order to acquire the corresponding segment descriptor which is loaded into the descriptor file of the address unit.

The register file is capable of double access so that two addresses can be supplied to the file simultaneously and two registers accessed simultaneously.

The ALU (210) is capable of all Intel 8086 ALU functions. In addition, fast multiply, divide, and shift hardware is built-in.

The address unit generates effective addresses from information received from the execution and instruction units. The effective address is translated to a real memory address and checked for conformance with the protection rules and limit bounds. The real address is transmitted to the bus unit. Bus cycle requests are received from the execution unit which specifies bus cycle type and segment.

The address unit accepts control information from the execution unit. This control information is capable, if the address unit is not busy, of causing the address unit to accept information from the execution unit (main register file) and the instruction unit (the displacement field of the instruction queue) into its two input buffers.

There are two methods by which effective addresses are generated. One method covers all addressing modes which use less than three operands (one register, displacement only, two registers, or one register and displacement). In this case the operands are latched into the input buffers (if only one operand is required, one input buffer is loaded with zeros) and the effective address is calculated as the sum of the values in the two input buffers.

The second method covers the address modes which require three operands (two registers and a displacement). In this case, the two register values are loaded into the input buffers and the sum is calculated. This sum is then loaded into one of the input buffers and the displacement is loaded into the other input buffer. Finally, the effective address is generated as the sum of these values in the input buffers.

The limit checker (226) tests the effective address against the limit of the selected segment.

The address relocator (228, 230) generates a real address by adding the effective address to the base of the selected segment.

The address counter (223) is used for rapid loading and unloading of the descriptor file.

The violation tester (225) monitors the access rights of the selected segment and the limit checker to determine if a memory protection violation has occured.

For all addressing modes which require less than three operands, the address unit is capable of generating the effective address, performing the limit test, and generating the real address, all in the processor clock cycle.

For addressing modes which require three operands, the address unit performs these functions in the two processor clock cycles.

Figure 4A:
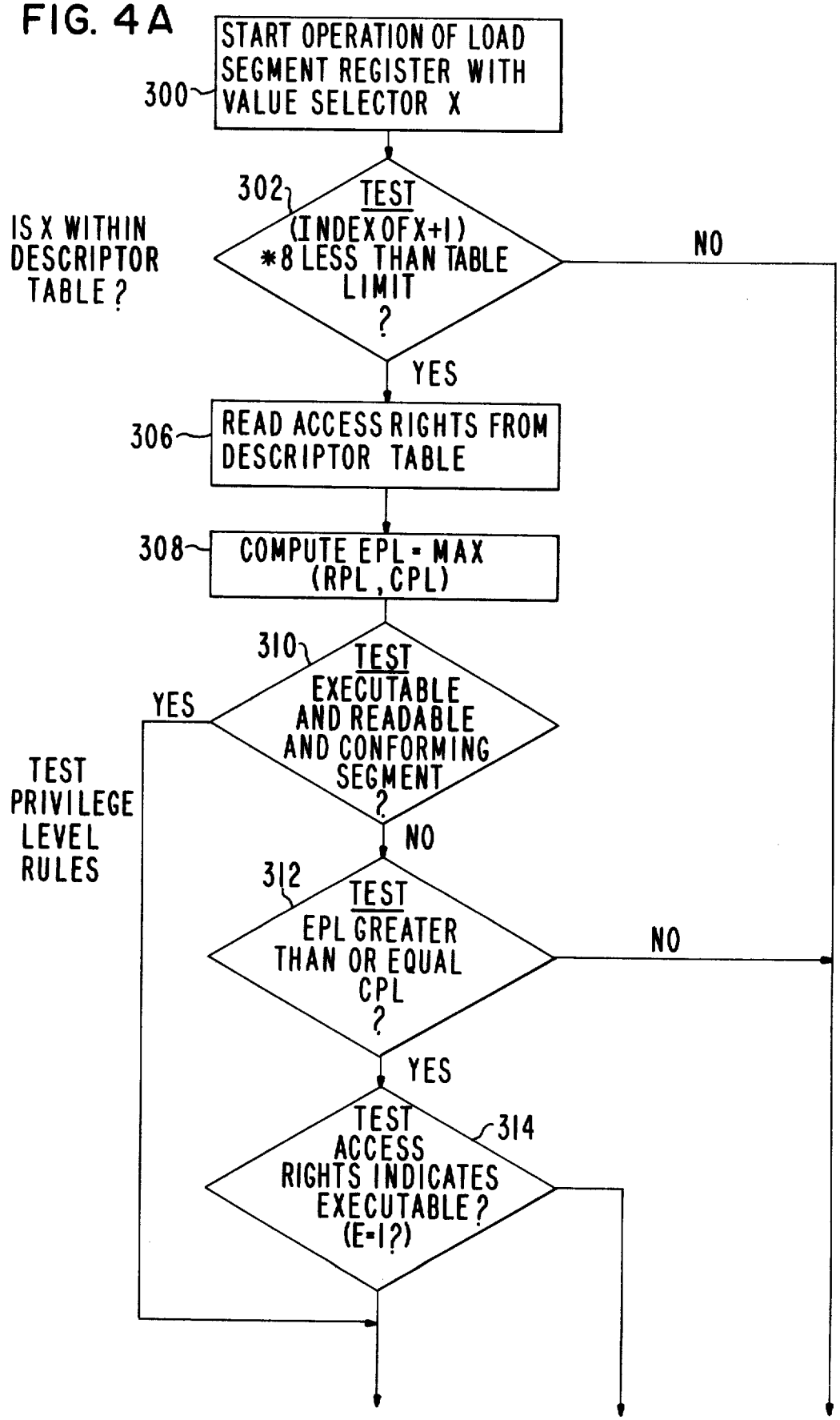
FIGS. 4A and 4B are a flow chart illustrating the steps performed by the processor hardware to accomplish an example operation of the intended protection operations.
Figure 4B:
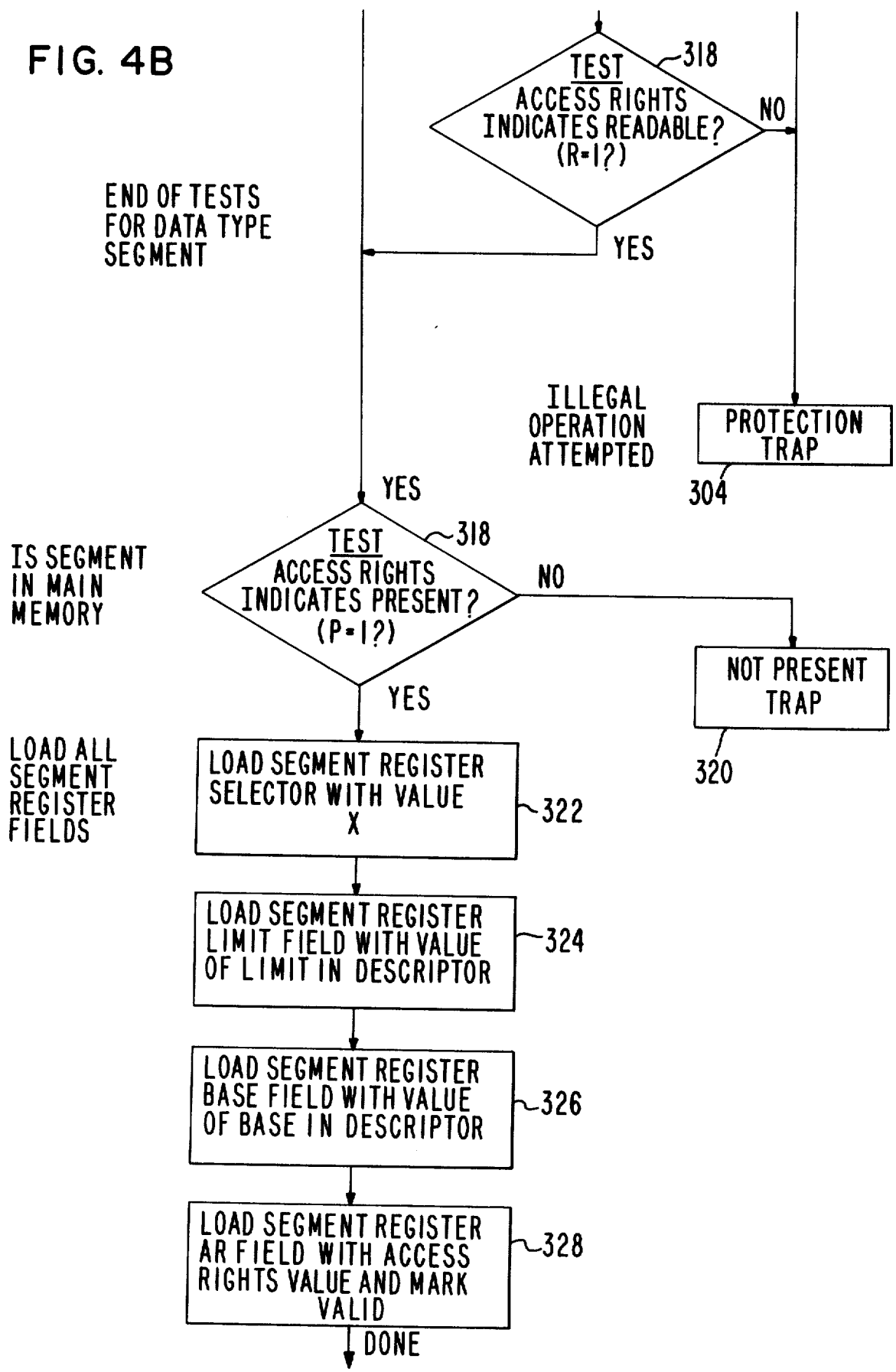

Refer now to FIGS. 4A and 4B which comprise a flow chart for load-data-segment-register operation. The purpose of the flow chart is to illustrate the implementation of segment register operations, and descriptor accessing and protection tests. This sequence of operations is implemented in hardware which consists of registers for the various fields of the segment register, shown in FIGS. 2 and 3, data paths to access memory, registers for representing the location in physical memory of the descriptor tables, boolean logic for performing the tests (conditional operations) of the flow chart (240, 244, 246) and conventional control logic (242) to control the sequential operations.

The operation starts at block 300 with the loading of a selector X into the segment register (110). The flow proceeds to decision block 302 which tests to see if selector X is within the descriptor table. If yes, the logic reads the access rights (114) from the descriptor table. If the test in block 302 is negative, a protection trap (304) occurs. The flow from block 306 proceeds to block 308 which computes the effective privilege level (EPL) (see privilege level logic FIG. 3, block 256) which is the numeric maximum of the requested privilege level (RPL) and the current privilege level (CPL). At decision block 310 a test is made to see if the segment X is executable and readable and conforming segment. If no, a test is made in block 312 to see if the EPL is greater than or equal to the CPL with respect to the segment which is then visible (see privilege level logic FIG. 3, block 240). If no, a protection trap occurs. If yes, the flow continues to block 314, wherein a test is made to see if the access rights indicate that the segment is executable (E=1). If yes, then this ends the test for data-type segment and the flow continues to block 316. If no, a further test is made to see if the access rights indicate readable (R=1) at decision block 318. If no, a protection trap occurs. If yes, this ends the test for data-type segment and the flow proceeds again to decision block 316. At decision block 316 a test is made of privilege level restrictions (see privilege level logic FIG. 3, block 240). The same sequence of flow steps are taken as for block 308, 310, and 312. If the result of these tests if no, a protection trap occurs. If the result of these tests if yes, the flow proceeds to decision block 318 where a test is made to find if the segment is in main memory; that is, does the access rights indicate present (P=1). If the result of this test is no, a not-present trap occurs at 320. If the result of this test is yes, the flow proceeds to load all segment register fields (block 322, 324, 326, and 328) (see privilege level logic FIG. 1, blocks 110, 112). Once this is completed, the operation for loading the segment register is complete.

To summarize, what has been illustrated by the foregoing flow chart description is how the protection mechanism of the present invention is utilized to protect the accessing of segments in memory.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. For use in a data processing system having a memory for storing information which is classified into various categories called objects of said system, and a central processing unit connected to said memory,
   said central processing unit including a protection mechanism having levels of privilege, wherein said central processing unit has access to tables stored in said memory, said tables containing object descriptors, said object descriptors providing controlled access to real memory space in said memory by a task (processing path) executing on said central processing unit, each of said object descriptors being typed and assigned a descriptor privilege level (DPL), such that access is allowed to some of said objects within said memory and access is denied to others of said objects within said memory, depending upon the descriptor privilege level assigned to said objects, the type assigned in the object descriptor, the type of operation requested in said executing task, and the current privilege level (CPL) of execution of said executing task, said central processing unit comprising:

memory accessing means connected to said memory, said memory accessing means including memory address registering means for registering memory addresses for use by said memory in accessing said objects stored in said memory, first means connected to said memory accessing means for registering first access information, said first access information providing first memory address information for locating said tables of object descriptors stored in said memory;

second means for registering a plurality of privilege levels, said privilege levels being assigned to a linearly ordered set of more privileged and lesser privileged levels;

third means for registering a task state segment, said task state segment including indicators which associated one or more of said tables of object descriptors with a task (processing path), said associated tables of object descriptors, in the aggregate, representing the entire set of objects in the address space of the task;

fourth means, connected to said second means, for registering a current privilege level (CPL) at any instant for a currently executing task, said current privilege level being a single unique member of said plurality of privilege levels registered in said second means, said CPL being based upon the progress of execution of said currently executing task;

fifth means for registering a segment selector, said segment selector including identifying means for uniquely identifying a particular object descriptor, said particular object descriptor being one of said object descriptors of said associated tables of object descriptors, within said address space of said task;

said fifth means including means for registering access rights information, said access rights information comprised of a number of bits of information, including descriptor privilege level bits (DPL) and type bits;

said type bits including bits for classification of said object descriptors into segment descriptors and control descriptors, said segment descriptors being permitted usage only for memory access and said control descriptors being permitted usage only for change of the operation path; and, logic means connected to said third, fourth, and fifth means, said logic means including comparing means connected to said fourth means and to said fifth means for comparing said CPL and said DPL of said particular object descriptor, said logic means including output means, connected as an input to said first means, for permitting access to said particular object indicated by said selector (registered in said said fifth means), by use of said first memory address information, said access being permitted only upon the condition that said access is from a more privileged current privilege level (registered in said fourth means) to the same or a less privileged level as specified by the DPL (registered in said fifth means) of said particular object descriptor.

2. The combination in accordance with claim 1 wherein said fifth means includes:

sixth means for registering at least one of said object descriptors;

wherein said type bits in said descriptor include bits for indicating the representation of space in real memory; and, wherein an object descriptor classified by said type bits as a segment descriptor includes information indicating the lowest permitted address to be accessed (segment base) and the highest permitted address to be accessed (limit);

seventh means for registering a pointer, said pointer containing a segment selector and offset, said seventh means including means for calculating a real memory address of a real memory location by using said segment selector and offset and for placing said real memory address on an output of said seventh means;

eighth means connected to said output of said seventh means and to said sixth means for calculating whether said real memory address on said output of said seventh means is between said highest and lowest permitted real memory address registered in said sixth means; and means included in said eighth means for signaling a fault upon the condition that said pointer registered in said seventh means is outside the permitted range indicated by said highest and lowest permitted real address registered in said sixth means.

3. The combination in accordance with claim 2 wherein said type bits registered in said fifth means include further bits for classifying at least one of said control descriptors as a procedure gate descriptor (as indicated by said further bits in said type), said procedure gate descriptor being a control descriptor and including a pointer indicating a target procedure;

ninth means for registering at least one of said procedure gate descriptors; and, violation detector means connected to said fifth means, to said memory accessing means, and to said ninth means, said violation detector means including output means connected as an input to said first means for limiting usage of said procedure gate descriptor exclusively to a plurality of operations as indicated by the type bits of said procedure gate descriptor.

4. The combination in accordance with claim 1 or claim 2 wherein said type bits includes further bits for classifying one of said segment descriptors (as indicated by said further bits in said type) as a task state segment descriptor, said task state segment descriptor recording the existence of a task (processing path), said real memory space represented by said task state segment descriptor indicating space in real memory for storage of information representing the status and address space of said task, said real memory space representing a task state segment; p1 said combination further comprising:

tenth means connected to said memory accessing means for registering second access information, said second access information providing second memory address information for locating a task state segment descriptor in said memory, said task state segment descriptor including:
- a number of bits specifying descriptor privilege level (DPL) and type bits,
- information indicating the lowest permitted real memory address to be accessed (segment base) and the highest permitted real memory address to be accessed (limit),
and
- means for indicating the gross status of the task as busy or not busy by means providing for dynamic modification of said type bits of said task state segment descriptor,
- said task state segment including detailed information sufficient to resume the path of processing of said task when said task is not actively processing;

thirteenth means responsive to the registering of a selector, said selector pointing to one of said task state segment descriptors, whereby the entire status of the processing path of the processor is recorded in the task state segment of said processing path and the processing path is diverted from the task registering said selector to a new processing path indicated by the contents of said task state segment indicated by said selector; and fourteenth means for recording in said task state segment indicated by said selector a separate selector indicating the task state segment representing the immediately prior processing path.

5. The combination in accordance with claim 4 wherein said task state segment descriptor includes third access information providing third memory address information for locating a task state segment,
said task state segment including pointers to a plurality of stack segments, a separate stack segment being provided for each of said plurality of privilege levels.

6. The combination in accordance with Claim 5 wherein said procedure gate descriptor includes a number of parameters required by said target procedure indicated by said pointer;
tenth means for registering said number of parameters required by said target procedure;
eleventh means connected to said fifth means and to said ninth means, responsive to said segment selector and to said procedure gate descriptor for determining the act of transition to a more privileged level;
twelfth means connected to said ninth means and to said eleventh means, responsive to said procedure gate descriptor for copying said number of parameters from the lesser privileged stack to the greater privilege stack; and
thirteenth means for recording the previous location of the lesser privileged stack upon the greater privileged stack.

7. The combination in accordance with Claim 4 wherein said combination is for use with a primary processor which supports a plurality of subsidiary processors, said primary processor including means for indicating the diversion of execution from one task to another task without requiring said task state segment to maintain the entire status of the processing task of said subsidary processors, the combination further comprising:
fifteenth means for recognizing the occurrence of a change in task of the primary processor from one of said tasks to another of said tasks;
sixteenth means connected to said fifteenth means for recording the occurrence of said change from one task to another task in a plurality of task switched (TS) bits, said task switched bits each being assigned to one of said plurality of subsidiary processors;
seventeeth means connected to said sixteenth means responsive to said task switched bits diverting said primary processor to a processing path suitable for changing the assignment of said subsidiary processor from the previous task to the present task upon the condition that an attempt is made to utilize said subsidiary processor subsequent to said recording of change from one task to another.

8. The combination in accordance with claim 1 wherein:
said fifth means for registering a segment selector includes means for registering bits within said segment selector signifying a requested privilege level (RPL); and wherein,
said comparing within said logic means further includes sixth means for comparing said CPL, RPL, and DPL, said sixth means connected to said output means of said logic means so as to permit access to said particular object by said selector only upon the condition that said DPL of said descriptor indicated by said selector is equal to or less than the privilege level of the lesser privileged of the privilege levels indicated by said RPL and said CPL.

9. The combination in accordance with claim 1 wherein said fifth means for registering a segment selector includes a plurality of segment registers, each segment register having an associated descriptor register for storing one of said object descriptors,
said segment registers including classification means for classifying said segment registers into two categories, the first of said categories indicating that a segment descriptor is for an executable segment and the second of said categories indicating that a segment descriptor is for a data segment.

10. The combination in accordance with claim 9 further comprising:
means connected to said segment descriptor registers for distinguishing said first category indicating that a segment is an executable segment;
said type bits including bits for indicating that said executable segment is nonconforming or conforming, depending upon the value of said type bits of said segment descriptor for an executable segment;
said comparing means within said logic means further including eighth means responsive to said DPL of said executable segment descriptor, said eighth means connected to said output means of said logic means so as to permit access to said particular object by said selector only upon the condition that said type bits indicate a nonconforming executable segment and the selector of said segment descriptor does not come from a procedure gate, and further including means operative upon the condition that said DPL of said segment descriptor is of different privilege than said CPL, for preventing the corresponding segment from being accessed; and, alternately, operative upon the condition that said type bits of said segment descriptor indicate a conforming executable segment, and further including means operative upon the condition that said DPL of said segment descriptor is of lesser privilege than said CPL, for preventing the corresponding segment from being accessed; and alternately, operative upon the condition that said type bits of said segment descriptor indicate a conforming executable segment, and further including means operative upon the condition that said DPL of said segment descriptor is of greater privilege than said CPL, for preventing the corresponding segment from being accessed; and, said comparing means further including ninth means responsive to said type bits, said ninth means connected to said output means of said logic means so as to permit access to said particular object by said selector only upon the condition that said type bits indicate a nonconforming executable segment, said selector of said segment descriptor coming from a procedure gate when said DPL of said segment is of greater privilege than said CPL and wherein, means are provided for changing said CPL to be equal to the DPL of said segment, and for changing the current stack segment to the stack segment assigned in said task state segment for the new CPL resulting in the invocation of a new stack segment at the new CPL, and for changing the RPL in said segment selector to be equal to said DPL; and conversely, upon the condition that said type bits indicate an executable conforming segment, for changing said RPL bits in said selector to be equal to the original CPL.

11. The combination in accordance with claim 1 wherein said type bits include further bits for classifying at least one of said control descriptors as a task gate descriptor, said task gate descriptor including a selector to a task state segment descriptor; the combination further comprising:

sixth means connected to said fifth means, for registering a task state segment descriptor, said task gate descriptor including a number of bits specifying a descriptor privilege level (DPL), type bits and other information including a selector whose corresponding descriptor is of said task state segment descriptor type.

12. The combination in accordance with claim 3 or claim 11 wherein means are provided for connection to an external device and wherein one of said tables comprising said address space of said task is designated as an interrupt descriptor table (IDT) wherein is recorded all of the objects responsive to external signals (interrupts), said IDT consisting of a plurality of descriptors of the type of said control descriptors, said control descriptors consisting of at least said type procedure gate and said type task gate;

tenth means responsive to the occurrence of an external signal from said external device for obtaining a number from said signalling external device representing an interrupt selector and for providing an interrupt operation signal, said interrupt selector being a specialized selector within said task address space to be specialized to indicate a descriptor recorded in said IDT;

eleventh means connected to said tenth means and responsive to said interrupt operation signal for registering said interrupt selector within said IDT, said interrupt selector uniquely identifying one of the descriptors with said IDT;

twelfth means connected to said tenth and eleventh means for performing the operation indicated by the contents of said control descriptor, to thereby divert the operation of said task to the performance of the procedure or task indicated by the pointer or selector recorded within said object descriptor;

said twelfth means including means responsive to said procedure gate for diverting execution to the location indicated by said pointer in said procedure gate, said twelfth means including means responsive to said task gate wherein the task previously operating has the previous task state recorded in the previously active task state segment, said task state segment indicated by said selector in said task gate being utilized as the source of the subsequent processing path state, said twelfth means including means for recording within said new task state segment the selector to said previous task state segment descriptor.

* * * * *